UNITED STATES PATENT OFFICE.

FRED E. LAMPE, OF NEWARK, NEW JERSEY.

SOLDERING COMPOSITION.

1,327,620.  Specification of Letters Patent.  Patented Jan. 13, 1920.

No Drawing.  Application filed November 10, 1919. Serial No. 336,882.

*To all whom it may concern:*

Be it known that I, FRED E. LAMPE, a citizen of the United States of America, and a resident of Newark, county of Essex, and State of New Jersey, have invented certain new and useful Improvements in Soldering Composition, of which the following is a specification.

This invention relates to a new and useful composition of matter for use in soldering, and its object is to provide a paste-like material which is easily fused and which contains both solder and a flux therefor and inflammable material. Another object is to improve upon such combined solder and flux compositions as have been known heretofore. A still further object is to provide a material which will not deteriorate and which is in a handy form and always ready for immediate use.

In accordance with my invention, I make a composition of powdered solder, resin and salammoniac, light and dark petroleum mixed together with ceresin wax. The whole is mixed together thoroughly into a paste-like substance of desired consistency.

The preferred proportions are:

40 lbs. powdered solder,
$\frac{1}{2}$ lb. resin,
4 lbs. salammoniac,
$4\frac{1}{4}$ lbs. light petroleum,
$2\frac{1}{2}$ lbs. dark petroleum,
$\frac{3}{4}$ lb. ceresin wax.

All of these materials except the solder and salammoniac are inflammable and the salammoniac is highly volatile. The result is that the substance as a whole is inflammable at low temperatures so that it may be easily melted. The material may be used by being applied to an article or articles to be soldered from a collapsible tube, for example, and ignited and melted in the flame of a match,—a perfect soldered patch or joint may be made with this material and in this simple manner, and more readily than is possible with such compositions as have been known.

The proportions set forth herein may be varied to suit the different conditions, but I have indicated what I now believe to be the preferred proportions. The consistency of the paste may be increased or diminished by using more or less of the ceresin wax, and if desired, the inflammability and melting point of the material may be increased or diminished by varying the proportions of the amounts of the petroleum, wax and resin.

What I claim is:

1. The herein described composition for soldering which comprises powdered solder, resin and salammoniac, light and dark petroleum and ceresin wax.

2. The herein described composition for soldering which comprises 40 pounds powdered solder, $\frac{1}{2}$ pound resin, 4 pounds salammoniac, $4\frac{1}{4}$ pounds light petroleum, $2\frac{1}{2}$ pounds dark petroleum and $\frac{3}{4}$ pound ceresin wax.

In witness whereof, I hereunto set my hand this 6th day of November, 1919.

FRED E. LAMPE.